United States Patent [19]

Cain et al.

[11] Patent Number: 5,457,736
[45] Date of Patent: Oct. 10, 1995

[54] SYSTEM AND METHOD FOR PROVIDING MICROCELLULAR PERSONAL COMMUNICATIONS SERVICES (PCS) UTILIZING EMBEDDED SWITCHES

[75] Inventors: Michael E. Cain, Arvada; Jo A. Friedman, Jamestown; Purushottam V. Kamat, Louisville; Phillip D. Reddick, Longmont; Peter L. Reinig, Lakewood; Dejan Sirovica, Boulder, all of Colo.

[73] Assignee: U S WEST Technologies, Inc., Boulder, Colo.

[21] Appl. No.: 226,789

[22] Filed: Apr. 12, 1994

[51] Int. Cl.$^6$ .............................. H04Q 7/22; H04M 11/00
[52] U.S. Cl. ........................... 379/60; 455/33.2; 455/56.1
[58] Field of Search ................................. 379/58, 59, 60, 379/97; 455/33.1, 33.2, 54.1, 54.2

[56] References Cited

U.S. PATENT DOCUMENTS

| | | | |
|---|---|---|---|
| 4,980,907 | 12/1993 | Raith et al. | 379/63 |
| 5,175,878 | 12/1992 | Davis et al. | 455/103 |
| 5,195,091 | 3/1993 | Farwell et al. | 370/94.1 |
| 5,247,347 | 9/1993 | Litteral et al. | 358/85 |
| 5,315,636 | 5/1994 | Patel | 379/59 |
| 5,329,578 | 7/1994 | Brennan et al. | 379/97 |
| 5,353,331 | 10/1994 | Emery et al. | 379/59 |

OTHER PUBLICATIONS

"Cellular Mobile Radio as on Intelligent Network Application" M. Ballard, E. Issenmann, M. Moya Sanchez, Electrical Communication vol. 63 #4, 1989.

"Intelligent Network Concepts in Mobile Communications" Bijan Jabbari IEEE Communications Magazine, Feb. 1992.

"System 900: The ISDN Approach to Cellular Mobile Radio" M. Wizgall, W. Weiss Electrical Communication vol. 63 #4, 1989.

*Primary Examiner*—Curtis Kuntz
*Assistant Examiner*—William G. Trost
*Attorney, Agent, or Firm*—Brooks & Kushman

[57] ABSTRACT

A system and method adapted to provide microcellular Personal Communications Services (PCS) through the use of an improved Distributed Radio Port Controller (DRPC) architecture. The architecture achieves the desired handover with minimal impact on the existing embedded base of switches by generating new calls from target Radio Port Controllers (RPCs) through the switches to anchor RPCs and internally bridging bearer channels without the knowledge of the switches. The system includes a Home Location Register (HLR) for storing and providing subscription data and keeping track of where the mobile terminals are registered in order to deliver calls. A PCS# database is also utilized for storing a list of Universal Personal Telephone (UPT) numbers which have been assigned to the PCS subscribers. The PCS# database is operable to map these UPT numbers to the locations of their corresponding HLR. The system further includes a Service Control Point (SCP) which is provided in electrical communication with the switch, the HLR, and the PCS# database and which is operable to query the HLR for routing information and provide the received response to the switch.

9 Claims, 2 Drawing Sheets

SYSTEM AND METHOD FOR PROVIDING MICROCELLULAR PERSONAL COMMUNICATIONS SERVICES (PCS) UTILIZING EMBEDDED SWITCHES

TECHNICAL FIELD

This invention relates generally to mobile communications. More particularly, this invention relates to a system and method for providing microcellular Personal Communications Services (PCS) to subscribers at mobile terminals utilizing existing wireline switches in an Advanced Intelligent Network (AIN).

BACKGROUND ART

Wireless or "mobile" communications have been found to be of great value to station users who roam large geographic areas yet who desire immediate access to telephone services, especially in critical situations. Presently, the most common form of personal wireless communications are cellular telephones. Cellular telephones are operable in cooperation with known cellular networks which consist of four basic components: a Mobile Telephone Switching Center (MTSC); a cell site containing a controller and radio transceiver; system interconnections; and mobile or portable telephone units.

The MTSC is known to those skilled in the art as a digital telephone exchange which controls the switching between the Public Switched Telephone Network (PSTN) and the cell sites for all wireline-to-mobile and mobile-to-wireline calls as well as for mobile-to-mobile calls. The MTSC also processes mobile unit status data received from the cell site controllers, switches calls to other cells, processes diagnostic information, and compiles billing statistics.

In operation, when the MTSC receives a call from the Public Switched Telephone Network which is directed to a mobile telephone user, the MTSC deciphers the telephone number dialed by the wireline user and alerts the controllers at the cell sites to page the corresponding mobile unit. Similarly, when a mobile telephone user places a call, the MTSC accepts the dialing data from the cell site controller and dials the desired number for transmission to the PSTN.

As referenced above, typical cellular networks include multiple adjoining cells each of which contains at least one cell site controller which operates under the direction of the MTSC. The cell site controller manages each of the radio channels at the site, supervises calls, turns the radio transmitter and receivers on and off, injects data onto the control and user channels, and performs diagnostic tests on the cell site equipment. Each cell typically contains one radio transmitter and two radio receivers. As those skilled in the art will further recognize, in operation both receivers are generally tuned to the same frequency. However, the receiver which locates the stronger radio signal is continuously selected.

In these prior art systems, each cell further has at least one radio channel that transmits control data to and receives control data from the mobile units. This control data advises the mobile unit that a call is coming from the MTSC or, conversely, advises the controller that a mobile telephone user desires to place a call. To complete the connection, the controller uses the control channel to advise the mobile unit which user channel has been assigned to the call.

While cellular networks have been found to be of great value to mobile users whose travels span many miles, they have also been found to be prohibitively expensive to implement for small scale applications wherein system subscribers only desire wireless telephone services in limited geographic areas, such as, for example, within office buildings or in campus environments.

The Personal Communications Network (PCN) is a relatively new concept in mobile communications developed specifically to serve the aforementioned applications. Like cellular telephony, a Personal Communications Network relates telephone numbers to persons rather than fixed locations. Unlike cellular telephones, however, the PCN telephones are directed to small geographic areas thus defining "microcellular" areas designed to operate in similar to fashion to large scale cellular telephone networks. PCN technologies are also similar to residential cordless telephones in that it utilizes base stations and wireless handsets. Unlike the former, however, PCN technology utilizes advanced digital communications features which may be implemented either as private networks or regulated services. When offered by communications carriers as services, this PCN capability is generally referred to as Personal Communications Services (PCS).

Microcellular Personal Communications Services (PCS) are expected to provide wireless access for an increasingly important segment of the communications market. Such PCS services therefore must meet the needs of the consumer market where expectations for good speech reproduction, immediate availability, low congestion, seamless handover of all calls and universal access are demanding.

There are presently in existence non-cellular, wireless PCN systems which require the design and implementation of complete overlaying networks to achieve the above-mentioned desired telephone services. See, for example, U.S. Pat. No. 4,980,907 issued to Raith et al and assigned to Telefonaktiebolaget L M Ericsson. This approach of providing a substantially new overlay of network components is, of course, highly expensive to implement and undesirable from a Local Exchange Carrier (LEC) perspective.

Consequently, a need has developed to provide a system and method for providing microcellular Personal Communications Services (PCS) which utilizes existing wireline switches for PCS deployment. More particularly, a need has developed to provide a distributed radio port controller (D-RPC) architecture which supports such a PCS system with minimal impact on the existing embedded base of switches.

DISCLOSURE OF THE INVENTION

It is a principal object of the present invention to provide a method and system for providing microcellular Personal Communications Services (PCS) with handover functionality to subscribers with mobile terminals.

Still further, it is an object of the present invention to provide a method and system as disclosed above which are further adapted for use in cooperation with existing wireline switches in an Advanced Intelligent Network (AIN) so as to minimize the need for additional network components.

It is a further object of the present invention to provide a system and method as disclosed above which are adapted to provide PCS services through the use of an improved Distributed Radio Port Controller (DRPC) architecture which achieves the desired handover with minimal impact on the existing embedded base of switches by generating new calls from target radio port controllers through said switches to anchor RPCs and internally bridge bearer channels without the knowledge of the switches.

In carrying out the above objects and other objects, features and advantages of the present invention, the system provided for by applicant includes a Home Location Register (HLR) for storing and providing subscription data and keeping track of where the mobile terminals are registered in order to deliver calls thereto. A PCS #database is also provided for storing a list of Universal Personal Telephone (UPT) numbers which have been assigned to the PCS subscribers. The PCS #database is further operable to map these UPT numbers to the locations of their corresponding HLR.

As disclosed herein, the system further includes a Service Control Point (SCP) which is provided in electrical communication with the aforementioned switch, the HLR and the PCS #database and which is operable to query the HLR for routing information and provide the received response to the switch. Still further, there is provided a plurality of Radio Port Controllers (RPCs) each having a corresponding serving area and provided in electrical communication with the switch. Each of these RPCs further includes at least one radio port (RP) having a corresponding coverage area which is provided in electrical communication with its corresponding RPC on a selected bearer channel for transmitting and receiving calls from the mobile terminals which are registered within the RPC serving area.

Finally, the discussed system includes a Visitor Location Register/Directory Number Manager (VLR/DN-Mgr). The VLR-DN Manager is provided in electrical communication with the switch, the HLR and the plurality of RPCs for storing information regarding the RPCs currently anchoring PCS calls. The handover is provided by the present invention when the mobile terminals enter adjacent RP coverage/RPC serving areas and communicate with target RPs/RPCs. As disclosed herein, in the latter case, i.e., inter-RPC handover, following such communication, new calls are generated from the target RPCs through the existing wireline switch to the anchor RPCs. At that point, the bearer channels are internally bridged within the RPC so as to provide seamless call handover.

In further carrying out the above objects, features and advantages of the present invention, there is provided a method for providing microcellular Personal Communications Services with handover functionality which, like the above disclosed system, is adapted for use in cooperation with the existing base of embedded wireline switches in an Advanced Intelligent Network. The method comprises storing subscription data for the system subscribers in a Home Location Register as well as storing a list of Universal Personal Telephone numbers which have been assigned to the subscribing mobile terminals in a PCS #database. The method requires the mapping of UPT numbers to the locations of the corresponding HLR as well as the provision of a Service Control Point in electrical communication with the switch, the HLR and the PCS #database.

By monitoring the switch to detect predetermined AIN triggers, a query may be generated at the switch upon such detection for receipt by the SCP. The generated query requests call routing information.

In keeping with the invention, the method further includes the provision of a plurality of Radio Port Controllers (RPCs), each having a corresponding serving area and provided in electrical communication with the switch. Each of these RPCs further has at least one Radio Port (RP) provided in electrical communication with the RPC and a selected bearer channel for transmitting and receiving calls from mobile terminals registered within the RPC serving area.

By receiving and storing information from the mobile terminals in a Visitor Location Register/Directory Number Manager regarding the RPCs currently anchoring PCS calls, queries may be generated at the SCP for receipt by the VLR-DN requesting such anchor information on selected mobile terminals. Thereafter, calls may be routed to the selected mobile terminal through the determined anchor RPC. When the mobile terminal enters adjacent RPC serving areas, an electrical signal is generated at the mobile terminal for receipt by a target RPC. Following receipt of this electrical signal, a new call is generated which is directed to the anchor RPC through the switch. Finally, the bearer channels are internally bridged within the anchor RPC so as to provide handover functionality without the knowledge of the switch as contemplated by the present invention.

The above objects and other objects, features, and advantages of the present invention are readily apparent from the following detailed description of the best modes for carrying out the invention when taken in connection with the accompanying drawings wherein like reference numerals correspond to like components.

BEST MODES FOR CARRYING OUT THE INVENTION

Figure 1:
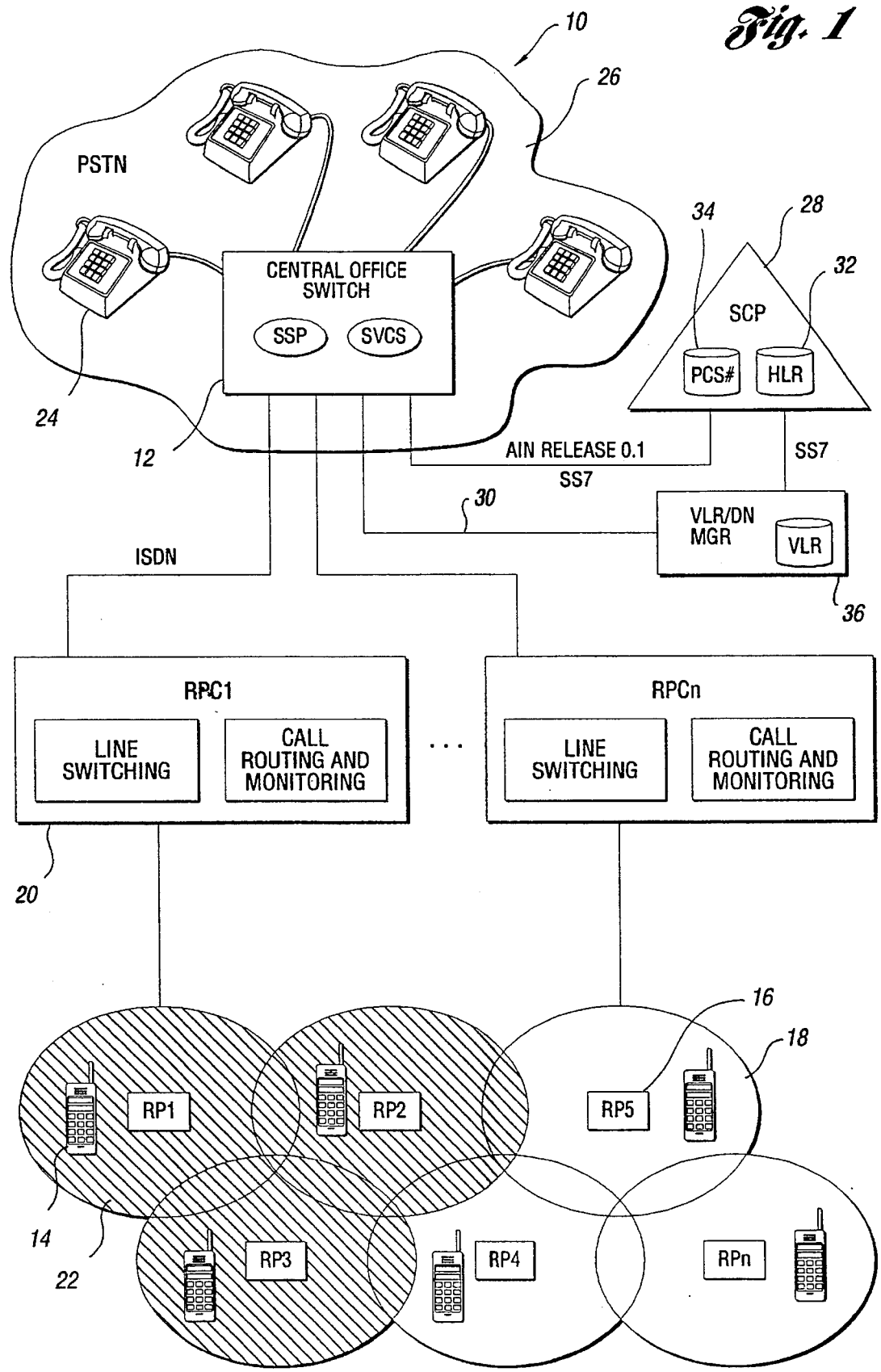
FIG. 1 is a schematic diagram of the system of the present invention for providing microcellular Personal Communications Services to subscribers of mobile terminals.

With reference to FIG. 1 of the drawings, there is provided a schematic diagram of the system of the present invention which is designated generally by reference numeral 10. System 10 is specifically adapted for use in cooperation with the embedded base of existing wireline switches 12 found in a typical Local Exchange Carrier (LEC) of an Advanced Intelligent Network (AIN). As disclosed in further detail herein, switch 12 is adapted to provide microcellular Personal Communications Services (PCS) to subscribers at mobile terminals 14.

To achieve the desired handover functionality contemplated by the present invention, there is provided a Distributed Radio Port Controller (D-RPC) architecture which includes plurality of Radio Ports 16 (RP-1 RP-2 . . . RP-n), each having a corresponding coverage area 18 and provided in electrical communication with a corresponding radio port controller 20 (RPC-1, RPC-2 . . . RPC-n). The Radio Port Controllers 20 are further provided in electrical communication with switch 12 and with one another to define a plurality of RPC serving areas 22 for transmitting and receiving calls from mobile terminals registered therein.

As recognized by those skilled in the art, a Distributed Radio Port Controller architecture is a modified hierarchical PCS network architecture in which the mobility functions (e.g. handover) and some vertical services are handled by the Radio Port Controllers 20. Thus, in accordance with the present invention, the RPCs 20 are interconnected via voice and signaling circuits and use distributed processing techniques to handle PCS mobility functions. This minimizes upgrades to the existing switches. The D-RPC architecture can use a variety of transport options and configurations.

As shown and referenced above, the system of the present invention is adapted to be used with existing wireline switches such as Central Office Switch (COS) 12 which, in turn, is provided in electrical communication with a wireline Customer Premises Equipment (CPE) device such as telephone 24 through the Public Switched Telephone Network (PSTN) 26. Switch 12 is an ISDN capable switch. Switch 12 is also a Signaling Service No. 7 system (SS7), Service Switching Point (SSP) as shown by the label in FIG. 1. Still further, and in keeping with the invention, switch 12 is adapted to communicate with a Service Control Point (SCP) 28 with AIN 0.1 messages via SS7 network links 30. As shown by the SVCs (services) label in FIG. 1, switch 12 is also responsible for providing some of the services of the network, like call-waiting, to the subscriber. Other elements in the architecture may also support a subscriber's services. However, the short term goal contemplated by applicants is to implement the services in the most economical fashion.

Still referring to FIG. 1, each of the RPCs 20 control a number of radio ports (RPs) 16 and are responsible for handover functionality among RPs under its control as well as between other RPCs. Each RPC 20 is connected over an ISDN interface to a single switch such as COS 12. This ISDN interface supports both voice and signaling capabilities. The RPCs 20 are not physically connected directly to one another. Rather, in the preferred embodiment, inter-RPC signaling is made possible by existing ISDN interface provided by switch 12. Each RPC is however physically connected to a large number (potentially hundreds) of RPs 16 by some transport medium such as twisted-pair, coaxial cable, microwave link, etc. All aspects of radio technology must be handled by the RPCs 20 since the ISDN switch 12 is unaware of the radio portion of the call. As a result, the RPCs 20 have Radio Frequency (RF) related control functions and limited switching capabilities.

In operation, the RPC which is serving or "anchoring" the call in process, hands over an active call to a new or "target" RPC as the mobile terminal 14 moves into an adjacent RPC serving area 22. In accordance with the invention, a signaling connection exists between any two RPCs involved in a handover. This inter-RPC signaling connection is used primarily to support mobility for an active call. To enable this connection, the RPCs 20 use the existing ISDN interface of their associated switch 12 using X.25. The principles of this inter-RPC signaling are also applicable when RPCs 20 are connected to different switches.

As further shown in FIG. 1, the invention incorporates a Home Location Register (HLR) 32 for storing and providing subscription data and keeping track of where the mobile terminals are registered in order to deliver calls thereto. There is further provided a PCS #database 34 for storing a list of Universal Personal Telephone (UPT) numbers which have been assigned to the PCS subscribers and to map the UPT numbers to the locations of their corresponding HLR 32. As seen, Service Control Point 28 is provided in electrical communication with switch 12, HLR 32 and PCS #database 34. As disclosed in further detail below, SCP 28 is operable to query the HLR 32 for routing information and provide the same to the switch 12.

Also shown in FIG. 1 is a Visitor Location Register/ Directory Number Manager 36 which is provided in electrical communication with switch 12, HLR 32 and the plurality of RPCs 20. The VLR-DN Manager 36 is operable to store information regarding the RPCs currently anchoring PCS calls. This information includes temporary routing number, current terminal location, service profile, and handover activity. As appreciated by those skilled in the art, VLR/DN-Mgr 36 disclosed herein in accordance with the present invention has the traditional functionality of a cellular VLR[IS-41] component plus the added functionality of managing (assigning and unassigning) temporary routing Directory Numbers (DN) for PCS calls. The term "VLR-DN Manager" is used to signify the added functionality of DN management in the VLR. The VLR/DN Mgrs 36 are associated with a certain number of RPCs 20 based on their own message handling capacity. Significantly, the VLR/DN-Mgrs are fault-tolerant computing platforms that may be upgraded rapidly to provide new PCS capabilities.

In keeping with the invention, the VLR/DN-Mgr 36 shown in FIG. 1 has a signaling connection 38 to each of its associated RPCs 20. Since signaling traffic is anticipated to be high during busy hour periods, ISDN B channels may also be used to connect RPCs 20 with a VLR/DN-Mgr. The VLR/DN-Mgr 36 is also connected to the SS7 network such that it may communicate with HLR 32 to update a user's location and receive a downloaded service profile.

Attention is directed to the fact that in FIG. 1, the HLR 32 and PCS #database 34 reside in an SCP 28. While HLR and PCS #database 32 and 34 may, of course, reside on the same SCP as shown, they may also reside on different SCPs. In operation, the SCP 28 which is an AIN Release 0.1 SCP, is responsible for providing routing information for an originating switch 12, as referenced above.

The D-RPC architecture disclosed herein with the present system is well poised for an elegant transition to the evolving broadband network. Interconnecting RPCs 20 via a Metropolitan Area Network (MAN) (e.g. IEEE 802.6) or ATM network would require few modifications to the conceptual design. In addition, applicants contemplate that there may be benefits in off-loading some switching functions onto the inherent capabilities of a packet-based network. Thus, it may make sense to migrate call processing functions including vertical services away from the switch and into the RPCs 20 in future versions.

OPERATION

Figure 2:
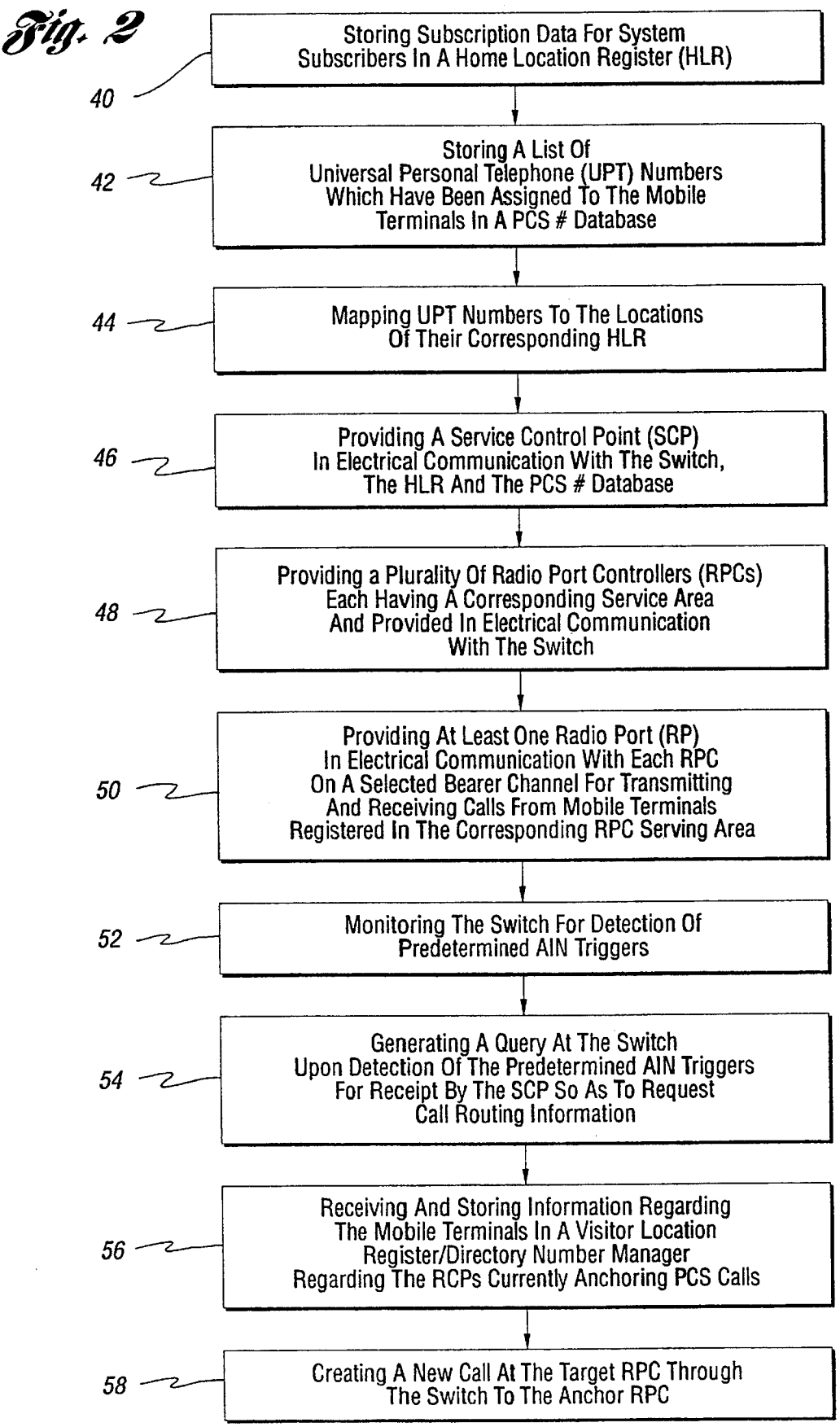
FIG. 2 is a block diagram of the method steps of the present invention.

With reference now to FIG. 2 of the drawings, the operation of the method of the present invention and, in particular, the handover functionality will be described in further detail.

As shown, the method of the present invention includes the steps of storing subscription data for system subscribers in a Home Location Register (HLR) 32 as shown in block 40 as well as storing a list of Universal Personal Telephone (UPT) numbers which have been assigned to the mobile terminals in a PCS #database 34 as shown in block 42. The method further includes mapping these UPT numbers to the locations of their corresponding HLR 32 as shown in block 44.

In keeping with the invention, the method further includes the provision of a Service Control Point (SCP) such as that shown in FIG. 1 and designated by reference numeral 28 which is provided in electrical communication with switch 16, HLR 32 and PCS #database 34 as shown in block 46. Still further, the method includes the provision of a plurality of Radio Port Controllers (RPCs) 20 each having a corresponding serving area and provided in electrical communication with the switch 16 as shown in block 48. Each of these RPCs are further provided with at least one Radio Port (RP) which is provided in electrical communication with the RPC and a selected bearer channel for transmitting and receiving calls from mobile terminals 14 registered in the corresponding RPC serving areas 22 as shown in block 50.

In an effort to minimize, if not eliminate, modifications to the base of embedded switches, switch 12 is adapted to be monitored for the detection of predetermined AIN triggers as shown in block 52. Upon such detection of such triggers, as shown in block 54, a query is generated at the switch 12 for receipt by SCP 28 so as to request call routing information.

In further keeping with the invention, information is received and stored from the mobile terminals in a Visitor Location Register/Directory Number Manager 36 regarding the RPCs currently servicing or "anchoring" PCS calls as shown in block 56. Significantly, the VLR/DN-Mgr is a separate network element which supports the functionality to manage directory numbers (DNs) across multiple RPCs and LEC switches. The VLR/DN-Mgr 36 provides gateway functionality, mapping X.25 messages from the RPCs to SS7/IS-41 messages to the HLR 32 (e.g. registration requests). This eliminates the need for individual RPCs 20 to have SS7 connectivity.

In operation, when a call is first delivered to a PCS user, i.e. a mobile terminal 14, the call is "anchored" 58 in the serving RPC for the duration of the call. Handovers between RPCs are handled without the knowledge of the switch 12. The RPC which is the "target" of a handover request creates a new call to the "anchor" RPC as shown in block 58. The anchor RPC bridges the bearer channels internally rather than having the switch bridge the call.

The high level of intelligence in the RPC network elements provides most of the PCS-related functionality in the RPC rather than the switch. RPCs 20 control handover, cache the user's service profile to implement some vertical services like 3-way calling, capture and forward usage information to the VLR-DN manager, and support terminal authentication. The D-RPC architecture disclosed herein may further be adapted to implement charging zones which enable a PCS service provider to set different billing rates depending on where the user sends/receives calls.

While the best mode for carrying out the invention has been described in detail, those familiar with the art to which this invention relates will recognize various alternative designs and embodiments for practicing the invention as defined by the following claims.

What is claimed is:

1. For use in an Advanced Intelligent Network (AIN) having an existing wireline switch, a system for providing microcellular Personal Communications Services (PCS) to subscribers at mobile terminals without using a mobile telephone switch, the system comprising:

a Home Location Register (HLR) for storing and providing subscription data and keeping track of where said mobile terminals are registered in order to deliver calls thereto;

a PCS number database for storing a list of Universal Personal Telephone (UPT) numbers which have been assigned to said PCS subscribers and mapping said UPT numbers to the locations of their corresponding HLR;

a Service Control Point (SCP) provided in electrical communication with said wireline switch, said HLR and said PCS number database, said SCP operable to query said HLR for routing information and provide said information to said wireline switch;

a plurality of Radio Port Controllers (RPC's) each having a corresponding serving area and provided in electrical communication with said wireline switch via ISDN signalling, each of said RPC's further having at least one Radio Port (RP) provided in electrical communication with said RPC for transmitting and receiving calls from mobile terminals registered in said RPC serving area and means for performing handover between a target RPC and a RPC currently serving a mobile terminal by bridging a call made from the target RPC to the RPC currently serving the mobile terminal internally, wherein said wireline switch has no knowledge of said handover; and a Visitor Location Register/Directory Number (VLR/DN) Manager provided in electrical communication with said wireline switch, said HLR and said plurality of RPC's for managing call information about said mobile terminals registered in said RPC serving areas by assigning and deleting temporary routing Directory Numbers (DNs) for said PCS calls.

2. The system of claim 1, wherein said wireline switch is an Integrated Services Digital Network (ISDN) switch.

3. The system of claim 1, wherein said wireline switch is a Signalling System No. 7 (SS7) Service Switching Point (SSP) operable to communicate with said SCP with AIN 0.1 messages via SS7.

4. The system of claim 1, wherein said HLR and said PCS number database reside on the same SCP.

5. The system of claim 1, wherein said SCP is equipped with AIN release 0.1 functionality.

6. The system of claim 2, wherein said wireline RPCs are connected to said switch via ISDN lines.

7. The system of claim 1, wherein said VLR/DN-Mgr is provided in electrical communication with said RPCs through an existing ISDN interface with said switch.

8. The system of claim 1, wherein said VLR/DN-Mgr is provided in electrical communication with said HLR via a SS7 signaling connection.

9. For use in an Advanced Intelligent Network (AIN) having an existing wireline switch, a system for providing microcellular Personal Communications Services (PCS) to subscribers at mobile terminals without using a mobile telephone switch, the method comprising:

storing subscription data for said subscribers in a Home Location Register (HLR);

storing a list of Universal Personal Telephone (UPT) numbers which have been assigned to said mobile terminals in a PCS number database;

mapping said UPT numbers to the locations of their corresponding HLR;

providing a Service Control Point (SCP) in electrical communication with said wireline switch, said HLR and said PCS number database;

monitoring said wireline switch to detect predetermined AIN triggers;

generating a query at said wireline switch for receipt by said SCP upon detection of said predetermined triggers, said query requesting call routing information;

providing a plurality of Radio Port Controllers (RPCs) each having a corresponding serving area and provided in electrical communication with said wireline switch via ISDN signalling, each of the RPCs further having at least one Radio Port (RP) provided in electrical communication with said RPC for transmitting and receiving calls from said mobile terminals registered in said RPC serving areas;

performing handover between a target RPC and a RPC currently serving a mobile terminal by bridging a call made from the target RPC to the RPC currently serving the mobile terminal internally, wherein said wireline switch has no knowledge of said handover; and managing call information about said mobile terminals registered in said RPC serving areas by assigning and deleting temporary routing Directory Numbers (DNs) for said PCS calls through the use of a Visitor Location Register/Directory Number (VLR/DN) Manager provided in electrical communication with said wireline switch, said HLR and said plurality of RPC's.

* * * * *